Oct. 21, 1969    R. I. SATTLER ET AL    3,473,269

GRINDING APPARATUS

Filed May 5, 1967    3 Sheets-Sheet 1

INVENTOR
ROBERT I. SATTLER
JOHANNES L. VAN DEN KIEBOOM
PAUL T. JOICHI

BY Olsen and Stephenson
ATTORNEYS

INVENTOR
ROBERT I. SATTLER
JOHANNES L. van den KIEBOOM
PAUL T. JOICHI
BY Olsen and Stephenson
ATTORNEYS INVENTOR
ROBERT I. SATTLER
JOHANNES L. van den KIEBOOM
PAUL T. JOICHI BY *Olsen and Stephenson*
ATTORNEYS

United States Patent Office 3,473,269
Patented Oct. 21, 1969

3,473,269
GRINDING APPARATUS
Robert I. Sattler, Grosse Pointe Shores, Paul T. Joichi, Highland Park, and Johannes L. van den Kieboom, St. Clair Shores, Mich., assignors to La Salle Machine Tool, Inc., Warren, Mich., a corporation of Michigan
Filed May 5, 1967, Ser. No. 636,533
Int. Cl. B24b 5/00, 49/00, 51/00
U.S. Cl. 51—118                   8 Claims

ABSTRACT OF THE DISCLOSURE

Automatic apparatus for grinding opposite faces on a disk member in which rotatable grinding heads are first floatingly engaged with the faces and then moved concurrently against the faces so as to remove predetermined amounts of material from the faces.

BACKGROUND OF THE INVENTION

Grinding apparatus in which a rotatable grinding head is driven is well known and is used for a variety of purposes. The present invention relates to the application of grinding heads of this type to automated apparatus in which the brake faces on disk-shaped members for disk brake assemblies are finished by the grinding process without manual handling of the members. Due to the allowable tolerances on the disk member and its associated support, bearing parts and the like, the brake faces on the disk member are not uniformly spaced and located on all of the members. Consequently, the principal problem in automated apparatus for finishing these faces is to finish the faces by removing a minimum of material for efficiency purposes. No pertinent prior art dealing with this problem or showing apparatus capable of handling this problem is known.

SUMMARY OF THE INVENTION

The grinding apparatus of this invention includes a pair of driven grinding heads which are attached to drive spindles that are mounted in body members attached to advanceable and retractable platens. A quill rotatably supports the drive spindle for each grinding head and the quill is in turn floatingly supported in the body member so that it can be advanced or retracted relative to the work and clamped in fixed positions relative to the body. As a result, with a disk member having faces to be ground positioned between the grinding heads, the platens are advanced from out-of-the-way positions to move the grinding heads into positions adjacent to but spaced from the workpiece faces to be ground. The quills are then unclamped and moved on their floating supports toward the workpiece. Since the quills are floatingly mounted, the grinding heads are free to more or less float relative to the workpiece so that a minimum of pressure is applied to the workpiece faces by the grinding heads. This step is thus for the purpose of engaging the grinding heads with the workpiece faces without removing significant amounts of material from the faces, and is desirable because the exact location of the faces is not known in each case. Further, this enables the grinding wheels to hunt for the workpiece in each instance so that wheel wear does not affect the accuracy of the operation. Concurrently with unclamping of the quills, the platens are slowly advanced predetermined distances toward the workpiece, while the quills are floating, to insure grinding head engagement with the workpiece faces and locate the quills for the next operation. The quills are then reclamped, and the platens are slowly moved predetermined distances corresponding to the amount of material which it is desired to remove from the workpiece faces for finishing purposes.

Thus, in the grinding apparatus of this invention, the workpiece faces to be ground are first located by the grinding wheels while the wheels are floating so that there is low pressure on the grind wheels to thus avoid unnecessary removal of material from the workpiece and unnecessary wear on the grinding wheels. As soon as the workpiece is located, a predetermined amount of material is removed therefrom by advancing the grinding wheels.

DESCRIPTION OF THE PREFERRED EMBODIMENT

Figure 1:
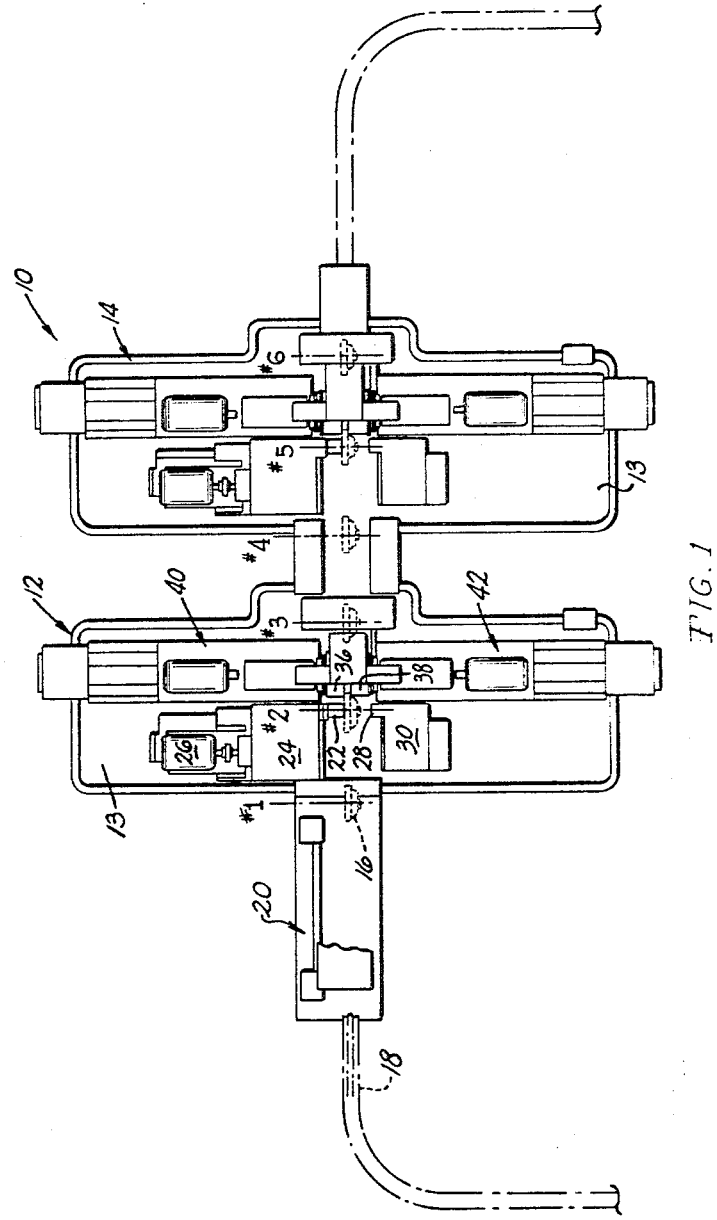
FIGURE 1 is a plan view of grinding apparatus incorporating this invention.
Figure 3:
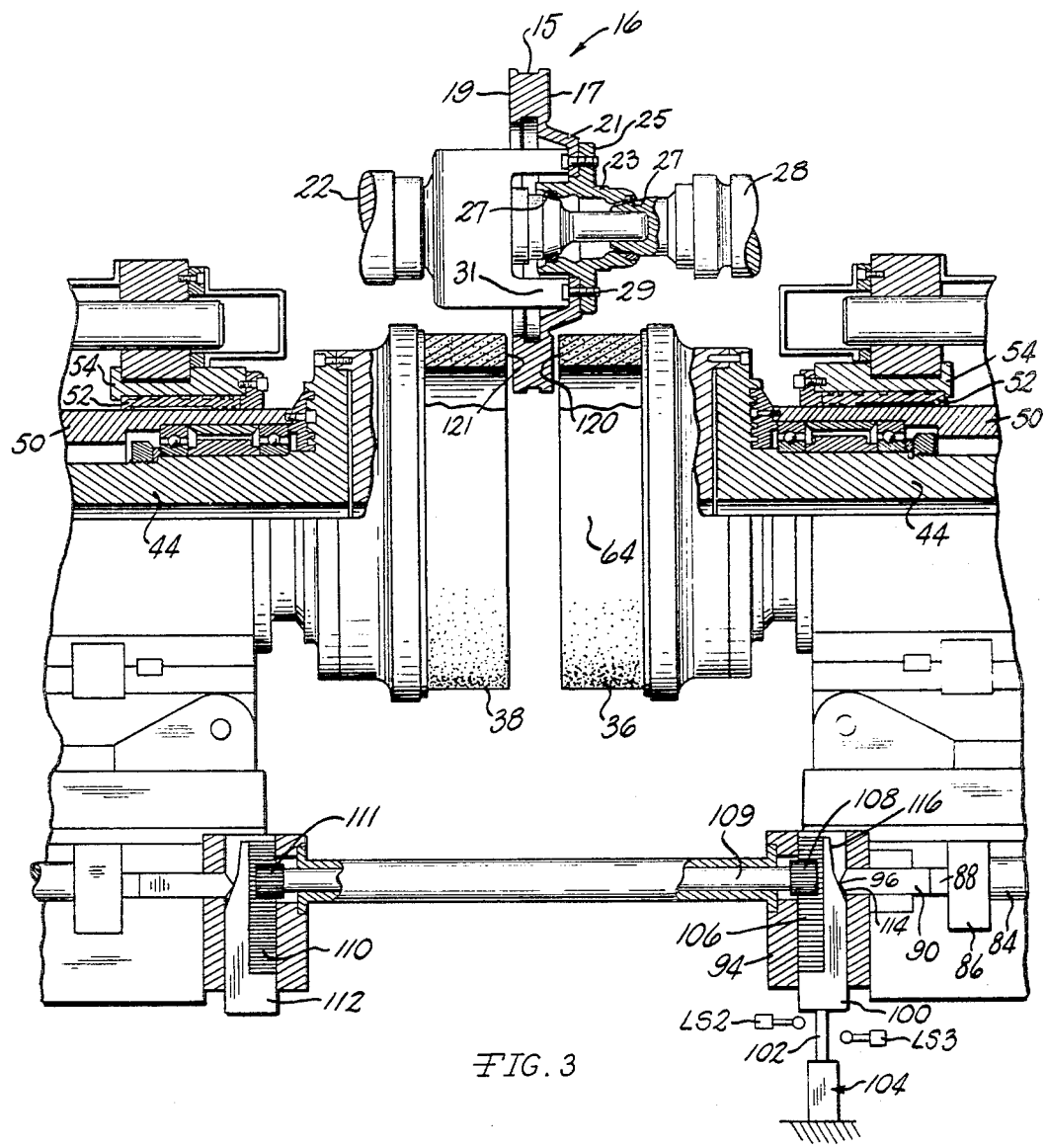
FIGURE 3 is a fragmentary view like FIG. 2 showing a pair of grinding heads in position immediately prior to contact with the workpiece.

With reference to the drawing, the apparatus of this invention, indicated generally at 10, is illustrated in FIG. 1 in a form in which two machine assemblies 12 and 14 are employed for coarse and finish grinding, respectively, of the workpieces, indicated at 16, which in this case are disk brake members. It is to be understood, however, that a single machine assembly 12 or 14 could be used for both coarse and finish grinding utilizing the apparatus of this invention. The assemblies 12 and 14 are identical, so that only the details of the assembly 12 will be described in detail hereinafter. Feeding apparatus, indicated generally at 18, delivers workpieces 16 to a transfer assembly, indicated generally at 20, which moves the workpieces through the six stations, illustrated in FIG. 1, formed by the assemblies 12 and 14. Stations #1, #3, #4 and #6 are idle stations and stations #2 and #5 are the grinding stations which are described in detail hereinafter. As shown in FIG. 3, the workpiece 16 consists of a disk member 15 having opposite brake faces 17 and 19 and a radially inwardly extending support flange 21. A bearing sleeve 23 has a flange 25 secured to the flange 21 by bolts 29 and is formed at opposite ends with bearing cups 27.

The assembly 12 includes a base 13 on which the structure hereinafter described is mounted for forming the grinding station #2. At station #2, a workpiece 16 delivered by the transfer assembly 20 is in a position in which the bearing cups 27 are centered on a spindle 22 on a driving head 24 and a spindle 28 on a live center unit 30. A motor 26 drives the head 24 so as to rotate the workpiece 16 by means of extensions 31 on the spindle 22 which drivingly engage the bolts 29. Thus, at station #2, the workpiece 16 is rotated about the axis of the spindle 22. During such rotation, the opposite faces 17 and 19 of the disk member 15 (FIG. 3) are disposed between a pair of tubular grinding wheels 36 and 38. The grinding wheels 36 and 38 are actuated by substantially identical support and drive assemblies 40 and 42, respectively, shown in FIG. 1, so that only the assembly 40 (FIG. 2) will be described in detail hereinafter, with like numerals indicating like parts on the assemblies.

The grinding wheel 36 is attached to a spindle 44 which is rotatably supported in bearings 46 and 48 carried by a tubular quill 50. Nuts 49 connect the spindle 44 and the quill 50 for concurrent axial movement. A ball spline assembly 51 drivingly connects an extension 45 on the spindle 44 to a pulley 55 driven by a motor 57. Thus, the motor 57 is operable to continually rotate the grinding wheel 36 during reciprocal movement of the spindle 44 to move the grinding wheel 36 toward and away from a workpiece 16 at station #2. The quill 50 is supported on low friction bearings 52 carried by a body 54 which is in turn mounted on a platen 56 by means of an adjustable mounting assembly 58. The mounting assembly 58 includes an adjustable screw assembly 60 and pivots 61 and 62 and is for the purpose of adjusting the position of the axis 64 of the spindle 44 to position the axis 64 parallel to the direction of movement of the platen 56 which is slidably supported on a slide 66 for back and forth movement in the direction of the arrow 67.

The low friction bearing assemblies 52, which are preferably of hydrostatic type, are for the purpose of reducing to a practical minimum the friction between the quill 50 and the body 52 so that the quill 50 can float in a direction parallel to the spindle axis 64. A fluid actuated cylinder assembly 68 has a cylinder 70 fixedly mounted on the body 54 and a piston rod 72 connected to a plunger 74 which is in turn connected by a block 76 to the quill 50. The plunger 74 extends through a clamp 78 attached to the body 54, so that when the clamp 78 is actuated to grasp the plunger 74, the quill 50 is in effect clamped to the body member 54. However, when the clamp 78 is released, the cylinder assembly 68 can move the quill 50 relative to the body 54 in directions parallel to the spindle axis 64.

The platen 56 is reciprocated by means of a fluid actuated cylinder assembly 80 which has a cylinder 82 attached to the slide 66 and a piston rod 84 connected to a projection 86 on the platen 56. As a result, when the cylinder assembly 80 is operated to extend the piston rod 84, the platen 56 is moved to the left as viewed in FIG. 2 to move an actuating button 88 on the projection 86 into engagement with a displaceable stop 90 which forms a part of a wedge feed assembly 92 which is described in detail hereinafter.

Figure 2:
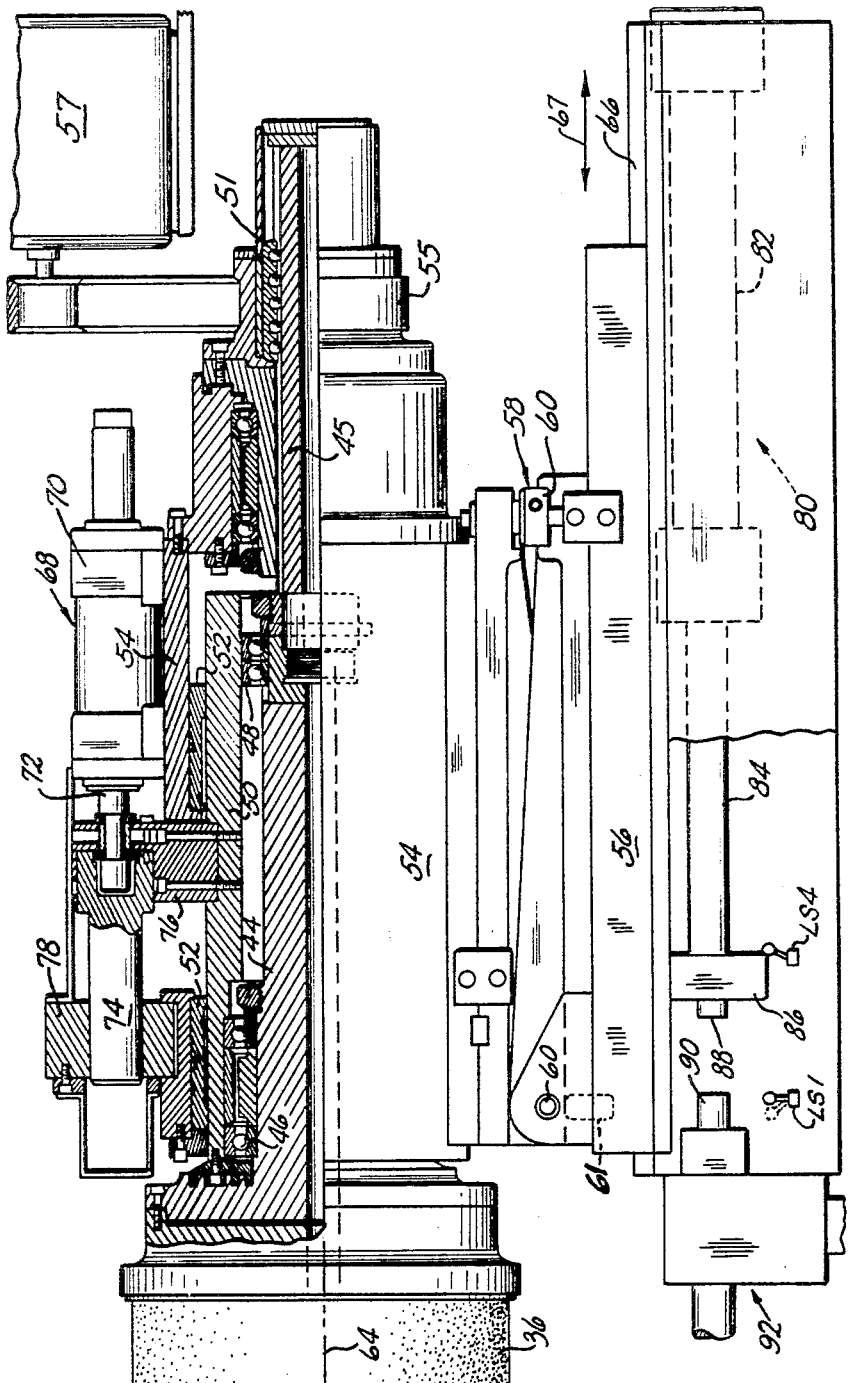
FIGURE 2 is an elevational view of a grinding station in the apparatus shown in FIG. 1, showing one grinding head and the platen therefor in a retracted position, with some parts broken away and other parts shown in section for the purpose of clarity.

As shown in FIG. 3, the displaceable stop 90 limits the rate of travel of the platen 56 toward the left as viewed in FIG. 2 to the rate at which the stop 90 is displaced inwardly into the housing 94 in which it is slidably supported. The inner end 96 of the stop 90 engages a wedge member 100 which is movable transversely of the spindle axis 64. As shown in FIG. 3, the wedge member 100 is connected to the piston rod 102 for a cylinder assembly 104 so that the wedge member 100 can be moved transversely of the stop 90 by the cylinder assembly 104. Rack teeth 106 on the wedge member 100 drive a pinion gear 108 on one end of a shaft 109 which has a pinion gear 111 on its opposite end engaged with similar rack teeth 110 on an identical wedge member 112 for the assembly 42. Thus, the pinion shaft 109 insures identical movements of the wedge members 100 and 112 in response to actuation of the cylinder assembly 104. The wedge member 100 has a coarse feed wedge surface 114 and a fine feed wedge surface 116 which is inclined at a lesser angle than the surface 114. Thus, during movement of the stop 90 on the surface 114, the platen 56 is moved at an advanced rate of speed relative to when the stop 90 is engaged with the wedge surface 116.

In the operation of the apparatus 10 of this invention, assume that a workpiece 16 located at station #2 is being driven by the spindle 22, and that the grinding wheels 36 and 38 are retracted relative to their positions shown in FIG. 1 so as to be out of the way during transfer of the workpieces 16 between the stations illustrated in FIG. 1. The grinding wheel 36 is then in substantially the position illustrated in FIG. 2. First, the cylinder assembly 80 is actuated to move the platen 56 to the left as viewed in FIG. 2 to move the grinding wheel 36 toward the workpiece 16.

One of the problems involved in machining the faces 17 and 19 on the workpiece 16 by grinding is caused by the inevitable wear of the grinding surfaces 120 and 121 of the wheels 36 and 38, respectively, and the fact that due to tolerance variations and buildups in the members 15 and 23 and the flanges 21 and 25, the faces 17 and 19 on a number of workpieces 16 are not in the same location when disposed at station #2. Consequently, to avoid engaging the grinding wheel 36 with the workpiece 16 when the grinding wheel is being moved rapidly and with considerable force by the cylinder assembly 80, the stop 90 is located at a position such that it will engage the button 88 and stop the platen movement when the grinding wheel 36 is close to but spaced from the face 17. For example, the stop 90 can be located such that the grinding wheel 36 which at this time is being roated by the motor 57, has its working surface 120 located approximately 0.050" from the workpiece face 17. When the button 88 engages the stop 90, the projection 86 actuates a limit switch LS1 which actuates the clamp 78 to release the plunger 74, and actuates the cylinder assembly 104 to slowly retract the piston rod 102.

Low hydraulic pressure is constantly maintained in the cylinder assembly 68 urging the plunger 74 to the left as viewed in FIG. 2, and the cylinder assembly 80 is still urging the piston rod 84 in the same direction. Thus, at this time, the quill 50 is released so that it will move, under the action of cylinder assembly 68, toward the workpiece 16 which is now disposed, as shown in FIG. 3, between the grinding wheels 36 and 38. Low pressure is maintained in the cylinder assembly 70 so that the grinding wheel surface 120 will engage the workpiece face 17 without any substantial force behind the grinding wheel 36 to thereby avoid removal of a significant amount of material from the workpiece face 17 at this time. Concurrently with unclamping of the plunger 74, the wedge 100 is retracted by the cylinder 104 so that the plunger 90 can move along the coarse feed wedge surface 114 into the housing 94. During such movement, the grinding wheel 36 can move with the quill 50 to the right as viewed in FIG. 2 in the event the location of the workpiece face 17 requires such movement. Thus, the grinding wheel 36 is floatingly maintained in engagement with the workpiece face 17 while the quill 50 is unclamped and while the stop 90 is being moved along the wedge surface 114.

When the wedge 100 has been moved to the point at which the stop 90 is engaged with the juncture of the wedge surfaces 114 and 116, the wedge 100 engages a limit switch LS2 which actuates the clamp assembly 78 to clamp the plunger 74 in its present position and thereby prevent the quill 50 from moving relative to the body 54. The wedge 100 is then further retracted by the cylinder assembly 104 so that the stop 90 moves into the housing at a very fine rate of feed along the wedge surface 116. During such movement, the grinding wheel 36 removes material from the workpiece face 17. The amount of material removed from the face 17 can be adjusted by adjusting the slope of the surface 116 on the wedge 100 and/or by adjusting the distance the wedge 100 is moved while the stop 90 is in engagement with the surface 116. Concurrently with this movement of the wheel 36, the grinding wheel 38 is being moved an identical distance to remove the same amount of material from the workpiece face 19 by virtue of the connection of the wedges 100 and 112 by the pinion shaft 109. The grinding wheels 36 and 38 thus operate concurrently to remove predetermined amounts of material from the workpiece faces 17 and 19, with the assemblies 40 and 42 being adjusted so that this amount is the practical minimum necessary for the particular grinding operation desired.

When the wedge member 100 engages a limit switch LS3, the position of which is adjustable, the pre-set amount of material has been removed from the workpiece faces 17 and 19 and the cylinder assembly 80 is actuated to return the platen 56 to its position shown in FIG. 2 in which the grinding wheel 36 is in an out-of-the way position in which it will not interfere with transfer of the workpieces 16 between the stations illustrated in FIG. 1. The limit switch LS3 also terminates operation of the cylinder 104 and provides for reverse actuation of the cylinder 104 to re-set the wedge 100 while the platen 56 is being retracted. Retraction of the platen 56 is terminated by engagement of the projection 86 with another limit switch LS4, and the above cycle is repeated for both the assemblies 40 and 42. From the above description, it is seen that the apparatus of this invention is operable to remove predetermined amounts of material from the disk member faces 17 and 19 even though the exact location of the surfaces 17 and 19 is unknown in each instance. This is accomplished by first floatingly engaging the grinding wheels 36 and 38 with the faces 17 and 19 to avoid abrupt engagement of the grinding wheels with the workpiece when the grinding wheels are under substantial pressure. The low pressure in the cylinder assembly 68 and the support of the quill 50 on the low friction bearings 52 enables this floating engagement and allows the quill 50 to back up relative to the workpiece if the location of the workpiece requires this movement. This arrangement also compensates automatically for wear of the grinding wheels 36 and 38 and the concurrent wedge feed of the platen 56 automatically re-sets the quill 50 each time so that it is in position for the next cycle. In addition, this arrangement makes it necessary to remove only minimum amounts of material from the faces 17 and 19 in order to achieve the desired finish in each case thus increasing the efficiency of the apparatus 10 and decreasing the cycle time in each case.

It will be understood that the grinding apparatus which is herein disclosed and described is presented for purposes of explanation and illustration and is not intended to indicate limits of the invention, the scope of which is defined by the following claims.

What is claimed is:

1. Grinding apparatus comprising a grinding head, a rotatable spindle attached to said head and having an axis of rotation, a tubular quill disposed concentrically about and rotatably supporting said spindle, a body movable in a direction substantially parallel to said axis, bearing means floatingly supporting said quill on said body for movement of said quill relative to said body in a direction substantially parallel to said axis, and clamp means selectively operable to secure said quill to said body for movement therewith.

2. Grinding apparatus according to claim 1 further including means for moving said body in said direction a predetermined distance.

3. Grinding apparatus according to claim 1 further including a platen and slide assembly supporting said body for movement in said direction, means on said slide attached to said platen for moving said platen to a predetermined position and thence moving said platen a predetermined distance from said position.

4. Grinding apparatus according to claim 2 further including means on said body attached to said quill for moving said quill in said direction on said bearings and relative to said body.

5. Grinding apparatus according to claim 4 wherein said means for moving said quill is a fluid actuated cylinder assembly.

6. Grinding apparatus according to claim 1 wherein said grinding head includes a tubular grinding wheel disposed in a concentric relation with said axis, and further including means for locating and rotating a disk member workpiece in a position in which a face thereon is adjacent to and engageable by one end of said grinding wheel.

7. Grinding apparatus according to claim 1 further including a fluid actuated cylinder assembly consisting of a cylinder attached to said body and a piston rod projecting from said cylinder, means connecting said piston rod to said quill so that on extension and retraction of said piston rod said quill is moved in a direction substantially parallel to said axis, plunger means attached to said piston rod, and wherein said means for selectively clamping said quill to said body includes a clamp assembly attached to said body and extended about said plunger for clamping engagement therewith.

8. Grinding apparatus according to claim 7 further including means for moving said body in said direction to a predetermined position, means operable in said predetermined position of said body for actuating said clamp assembly to release said plunger, means operable to subsequently actuate said clamp assembly to clamp said plunger, and means for subsequently moving said body further in said direction.

References Cited

UNITED STATES PATENTS

| 2,237,583 | 4/1941 | Birkigt. |
| 3,063,203 | 11/1962 | Busey _____ 51—111 |

FOREIGN PATENTS

| 838,573 | 5/1952 | Germany. |
| 494,611 | 7/1953 | Canada. |

HAROLD D. WHITEHEAD, Primary Examiner

U.S. Cl. X.R.

51—165